United States Patent [19]

van Gestel

[11] 4,321,640
[45] Mar. 23, 1982

[54] MAGNETO-RESISTIVE HEAD

[75] Inventor: Wilhelmus J. van Gestel, Eindhoven, Netherlands

[73] Assignee: U.S. Philips Corporation, New York, N.Y.

[21] Appl. No.: 31,259

[22] Filed: Apr. 18, 1979

[30] Foreign Application Priority Data

Apr. 25, 1978 [NL] Netherlands ............ 7804377

[51] Int. Cl.³ .................................... G11B 5/30
[52] U.S. Cl. ........................................ 360/113
[58] Field of Search ............................ 360/113

[56] References Cited

U.S. PATENT DOCUMENTS 3,921,217 11/1975 Thompson ................. 360/113
4,052,748 10/1977 Kuijk ........................ 360/113
4,150,408 4/1979 Koel et al. ................. 360/113

Primary Examiner—Robert S. Tupper
Attorney, Agent, or Firm—Robert S. Smith

[57] ABSTRACT

A magnetic head having a magnetoresistive element of the type which is covered with one or more strips of electrically readily conducting material which extend at an angle of approximately 45° with the longitudinal axis for causing a measuring current to flow through the element at an angle with the longitudinal axis. The magnetoresistive element bridges a gap between two components of magnetic material one of which is destined to cooperate with a magnetic recording medium. In this manner the edges of the element are magnetically short-circuited, which improves the linearity of the playback characteristic.

5 Claims, 8 Drawing Figures

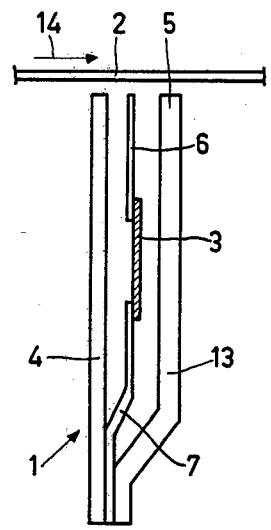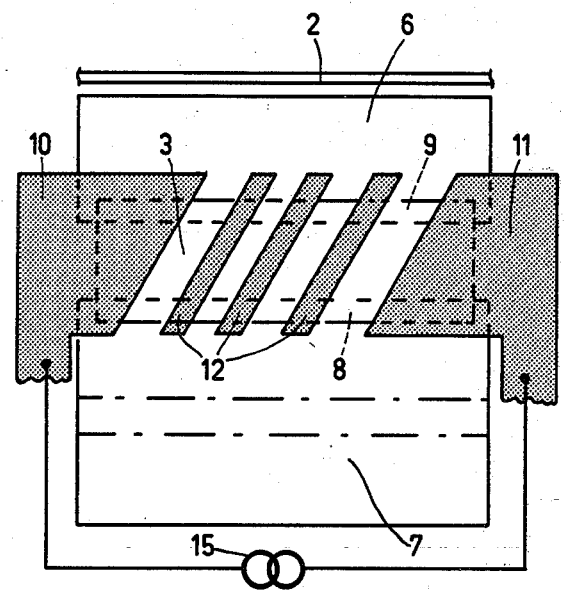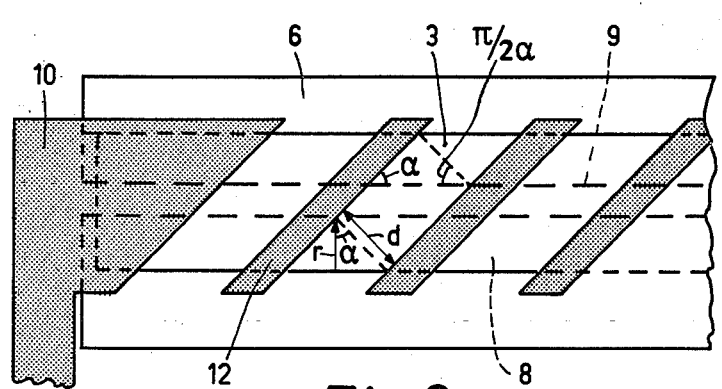
Fig.1    Fig.2
Fig.3

MAGNETO-RESISTIVE HEAD

The invention relates to a magnetic head for detecting information-representing magnetic fields on a magnetic recording medium movable relatively with respect to the magnetic head. The head is of a type comprising an elongate magneto-resistive element which at two oppositely located ends comprises contacts for the connection to a source of measuring current. The element shows such a magnetic anisotropy that the easy direction of magnetisation coincides with the longitudinal axis of the element and which comprises at least one electrically readily conductive strip which is provided obliquely on a surface of the element at an angle of at least 30° and at most 60° with the longitudinal axis of the element.

The invention relates to magnetic reading heads, in particular but not exclusively destined for detecting magnetic fields in magnetic recording media, for example, magnetic tapes or disks.

A magnetic head of the kind mentioned in the preamble is known from Philips Technical Review 37, pages 42–50, 1977, No. 2/3. In the known head, one or more oblique conductive strips are provided on one of the surfaces of the magneto-resistive element, preferably at an angle of 45° with the longitudinal axis of the element. These strips serve as equipotential strips so that the direction of the current in the element which is at right angles to the equipotential strips encloses an angle with the easy direction of magnetisation, preferably an angle of 45°. In this manner the operation of the known magnetic head is linearized: the relative resistance variation of the magneto-resistive element ($\Delta R/R$) as a function of the transversal external magnetic field ($H$) which is presented by a magnetic recording medium to be read is then represented as a matter of fact by a substantially linear odd function.

Although the known head has the advantage of a simple linearization, it has the drawback, however, that a certain deviation from the linear characteristic occurs as a result of the condition that near the edges of the magneto-resistive element extending in the longitudinal direction the angle at which the current flows with respect to the longitudinal axis varies until the angles becomes zero at the boundary of the element. The result of this is that in fact the playback characteristic of the known magnetic head is not represented by an odd function but by the sum of an odd function and an even function.

It is the object of the invention to provide a magnetic head of the kind mentioned in the preamble which does not exhibit the above-mentioned disadvantage.

For that purpose the magnetic head according to the invention is characterized in that it comprises two components of a magnetically permeable material located in line with each other, between which components a gap is present, the magneto-resistive element bridging said gap, the facing ends of the components of magnetically permeable material covering the edge zones of the magneto-resistive element extending parallel to the longitudinal axis, the end of one of the components of magnetically permeable material remote from the magneto-resistive element being destined to cooperate with a magnetic recording medium.

In this manner it is ensured the the edge zones of the magnetoresistive element extending parallel to the longitudinal axis are short-circuited magnetically by the magnetically permeable components. Since now substantially no magnetic flux originating from the recording medium flows through the edge zones, the contribution of their resistance variation to the overall resistance variation of the element is very small and hence also the non-linearity caused by the edge zones so that the playback characteristic has a much more linear variation than that of the known magnetic head.

A geometric arrangement of a magnetoresistive element as a bridge of a gap between two magnetically permeable elements is known per se from U.S. Pat. No. 3,921,217. The magnetoresistive element disclosed in this patent specification, however, is not of the kind to which the invention relates but of a kind in which it is necessary to apply a permanent magnetic field for the linearization of the playback characteristic of the magnetoresistive element so as to displace the workpoint to a linear area of the curve resistance/magnetic field. In a magnetic head having such a magnetoresistive element the problem for which the invention provides a solution does not occur.

More particularly, the magnetic head in accordance with the invention is characterized in that the edge zones of the magnetoresistive element covered by the ends of the components of magnetically permeable material correspond at least substantially with the areas of the element in which the direction of the current lines is not uniform when a measuring current flows through the element.

A preferred embodiment of the magnetic head in accordance with the invention is characterized in that the conductive strips enclose an angle $\alpha$ with the longitudinal direction of the magnetoresistive element and that the strips mutually have a distance d, the covering zones having a width which is substantially constant throughout the length of the element and is at least equal to $d \cos(\alpha)$.

Herewith it is achieved that the edge zones are covered entirely, which maximally reduces their non-linear contribution to the resistance variation.

A further preferred embodiment of the magnetichead in accordance with the invention is characterized in that the thickness of the magnetically permeable component which is destined to cooperate with the recording medium is larger than that of the magnetoresistive element.

This permits an increase in the height of the components, with magnetic losses remaining the same, so that wear due to the frictional contact with the recording medium has a smaller influence on the behavior of the magnetic head.

The magnetic head according to the invention also removes a further disadvantage of the known magnetic head. In the known magnetic head the covering of the magnetoresistive element by the conductive pattern of strips causes the track width to be inexactly defined. This is because an conductive material which is present on the magnetoresistive strip will short circuit the underlying magnetoresistive material. In the magnetic head in accordance with the invention one of the magnetically permeable components "sucks up" the flux of the recording medium and couples it towards the magnetoresistive element so that the width of the relevant component exactly defines the track width.

Another disadvantage of the known magnetic head is that it shows so-called Barkhausen noise because for its linearization it does not use a magentic bias field which also ensures that the occurrence of magnetic domains are prevented.

Since, as explained above, in the magnetic head according to the invention the width of one of the magnetically permeable components defines the track width, it is possible to cover the ends of the magnetoresistive strip with electrically conductive material for the current contacts over a comparatively large area without this influencing the track definition. In that case less trouble is experienced from the occurrence of magnetic domains at the ends of the strip, which domains contribute to the Barkhausen noise.

A further preferred embodiment of the magnetic head in accordance with the invention therefore characterized in that the ends of the magnetoresistive element where the contacts are present for the connection to a source of measuring current are covered with a layer of electrically conductive material over an area which is sufficient to cover magnetic domains formed at the said ends.

The invention will now be described in greater detail, by way of example, with reference to the accompanying drawing, in which FIG. 1 is a cross-sectional view and FIG. 2 is a longitudinal cross-sectional view of a magnetic head according to the invention.

FIG. 3 shows a part of FIG. 2 in greater detail.

Figure 4:
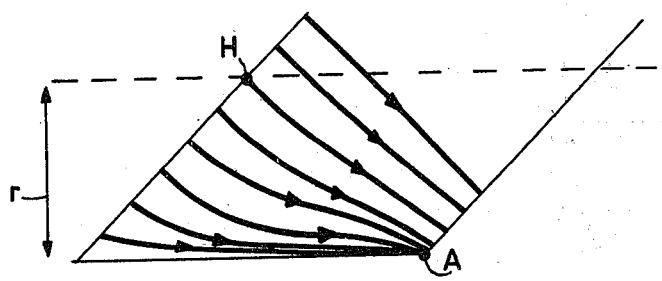
FIG. 4 shows diagrammatically the variation of the current lines at the edge of a magnetoresistive element on which oblique equipotential strips are provided

FIG. 1 shows a magnetic head 1 which serves to detect magnetic fields originating from a magnetic recording medium 2 moving past the head 1 in the direction of the arrow 14. The detection of the fields occurs by measuring the relative resistance variation of a magnetoresistive element 3 to which magnetic flux is supplied via a magnetically permeable component 6 (so-called flux conductor) which it engages with one edge, while the magnetic flux is removed via a magnetically permeable component 7 which it engages with its other edge.

Preferably the magnetic head according to the invention furthermore comprises a magnetic shield 4 which is combined with a shield 5, the shields enclosing a space within which the magnetic flux conductors 6 and 7 and the magnetoresistive element 3 are accommodated. The shields 4 and/or 5, however, are not essential. The components 6 and 7 are of a material of high magnetic permeability, for example, a nickel-iron alloy, and are arranged so that the component 6 faces the recording medium 2 and the component 7 is coupled to the magnetic shields 4 and 5.

As shown in FIG. 2, the components 6 and 7 may be longer than the magnetoresistive element 3 and they each cover edge zones 8 and 9 on respective sides thereof, while on the other side both contacts 10 and 11 which are connected to a source of measuring current 15, and electrically readily conductive strips 12 which are at an angle between 30° and 60°, preferably 45°, with the longitudinal axis of the element 3, are provided. These strips force the current to flow obliquely with respect to the longitudinal axis so that the element 3 as it were has an electric bias.

The covering zones preferably extend entirely over the regions of the magnetoresistive element 3 in which the direction of the current lines is not uniform.

FIG. 3 shows in more detail the width r of one of said regions, in which r can be derived in the following manner:

When, for example, d is the distance intermediate two conductive equipotential strips and $\alpha$ is the slope of these same strips with respect to the longitudinal direction of the magnetoresistive element, a simple trigonometric calculation gives:

$r = d \cdot \cos(\alpha)$.

The covering width should be at least equally large as the edge zone of the magnetoresistive element where the current lines do not extend uniformly, as shown in FIG. 4. The current lines are tracks which extend at right angles to the equipotential strips but the discontinuity at the edge interferes with the uniform variation of these lines over a given distance. This distance is obtained by projecting a point A which forms the base of a first equipotential strip, on an adjacent equipotential strip, which gives a point H.

In the zone which lies between a line through H and the edge the current lines show a varying angle with the longitudinal axis of the element (the easy direction of magnetization of the magnetoresistive element is parallel to the longitudinal axis).

Figure 5:
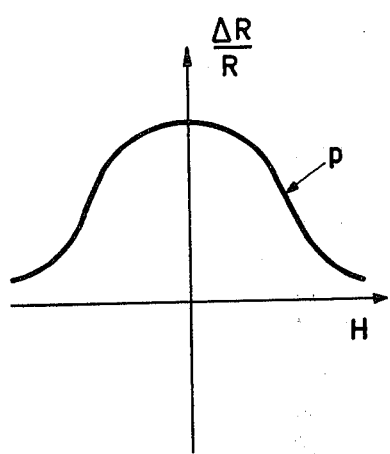
FIG. 5 is a graph which shows an even function representing the resistance variation ($\Delta R/R$) of a non-biased magnetoresistive element under the influence of an external magnetic field H.

The response of a magnetoresistive element in an unbiased state, that is where the current lines are parallel to the easy direction of magnetization, is represented by an even function p (FIG. 5). In FIG. 5, the strength of the external magnetic field H is plotted on the horizontal axis and the relative resistance variation $(\alpha R)/(R)$ is plotted on the vertical axis.

Figure 6:
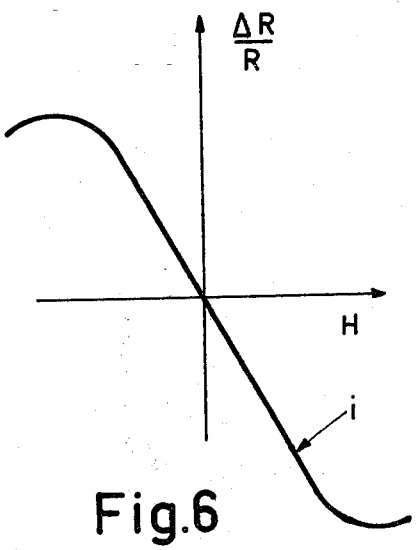
FIG. 6 is a graph which shows an odd function representing the ideal resistance variation $\Delta R/R$ of an electrically biased magnetoresistive element under the influence of an external field H.

The ideal response of an electrically biased magnetoresistive element in which the current lines extend uniformly at an angle of 45° with the easy direction of magnetization is represented by the odd function i in FIG. 6.

Figure 7:
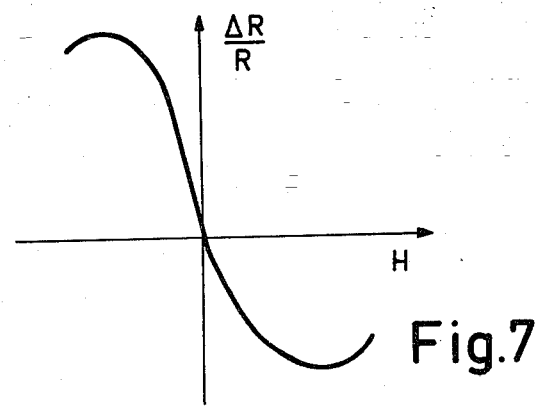
FIG. 7 is a graph which shows a function representing the non-ideal resistance variaton $\Delta R/R$ of an electrically biased magnetoresistive element under the influence of an external magnetic field H.
Figure 8:
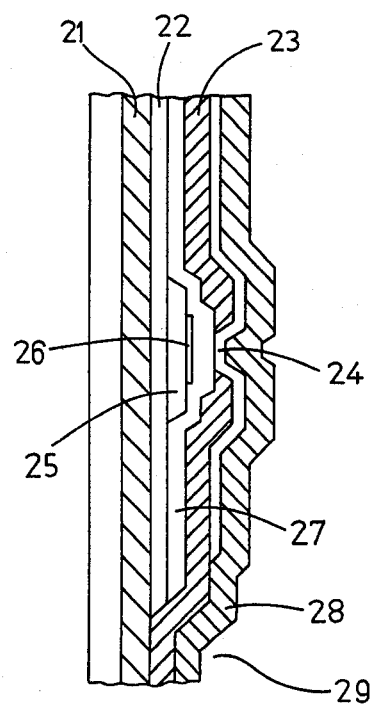
FIG. 8 is a cross sectional view of another embodiment of the invention.

However, because the current lines in the edge zones towards the edge will extend more and more parallel to the edge, the actual playback characteristic of the usual electrically biased magnetoresistive elements is represented by the sum of an odd function and of an even function with a coefficient which depends on the size of the zones having a non-uniform current variation (FIG. 7). In the magnetic head in accordance with the invention the edge zones are made inactive so that it is possible to drastically reduce the value of the coefficient of the even function and to approach the ideal playback characteristic of FIG. 6.

Further advantages resulting from the use of the magnetic flux conductors 6 and 7 are that the magnetoresistive element does not experience any mechanical wear since it is not in direct contact with the moving magnetic recording medium while fewer temperature fluctuations occur. This can permit the use of a higher measuring current having for its advantage that the magnetic field induced by the measuring current is strong enough to avoid flipping over of the magnetization vector (and this can reduce trouble from the Barkhausen noise).

Moreover, the width of the track which is read is better defined as a result of the use of the magnetic flux conductor 6.

The magnetic head according to the invention may be made by a construction in thin layers via suitable masks, which results in the following multilayer structure comprising:

a first magnetic layer 21 a first insulation layer of quartz 22 a second magnetic layer 23 of a nickel-iron alloy separated into two parts by an intermediate space 24 optionally, a layer of a material having a large magnetic resistance in the said intermediate space a magnetoresistive layer 25 which spans the said intermediate space one or more strips 26 of electrically conductive material which are provided obliquely on the magnetoresistive layer a second insulation layer 27 of quartz optionally, a third magnetic layer 28 in which the magnetic alloy layers are interconnected at one end via holes (not shown) in the quartz layers.

It will be apparent that many variations are possible to those skilled in the art without departing from the scope of the invention as defined in the appended claims.

Although the distortion of a current-biased magnetoresistive element with magnetically shortcircuited edge zones according to the invention is already substantially less than of a similar element the edge zones of which are not magnetically shortcircuited, some distortion may nevertheless remain. This appears to be due to the condition that the magnetoresistive head according to the invention is supersensitive to long-wavelength signals.

This disadvantage is avoided by an improvement of the inventive magnetic head, which improvment is the subject matter of copending application Ser. No. 031,236 filed Apr. 18, 1979 which was abandoned after filing of continuation application Ser. No. 230,846 on Feb. 2, 1981 relating to a magnetoresistive head of the above type which further includes a comparatively thick layer or element of magnetically permeable material which is positioned in facing relationship with the magnetoresistive element and is coupled magnetically to the second of the components (or flux conductors) of magnetically permeable material.

As a result of the coupling of such a magnetic element to that flux conductor which is remote from the recording medium, the magnetic flux which has been "sucked up" by that flux conductor which is near the recording medium can be returned to the recording medium, which increases the sensitivity of the element to short-wavelength signals. As a result of this, the overall sensitivity can be reduced, so that the element is the no longer supersensitive to long wavelengths.

Dependent on what kind of material is chosen for the comparatively thick element of magnetically permeable material, a good result is not always achieved. When comparatively small measuring currents (order 10 mA) are used which have the advantage that the (temperature) noise then is smaller than in the case in which comparatively large measuring currents are used, it has been found that the choice of alloys of the nickel-iron type for the comparatively thick element results in the fact that the gain obtained as regards distortion is partially lost. This is ascribed to the occurrence of one or a few localized domain walls in an element which is manufactured from nickel-iron. These domain walls can influence the magnetisation of the magnetoresistive element in such a manner that it is no longer related to the direction of the (weak) measuring current.

If the comparatively thick element of magnetically permeable material consists of magnetic ferrite, so many arbitrarily oriented domain walls will be present in the element that they have met no influence on the magnetoresistive element, so that when using an element of magnetic ferrite, a small measuring current is sufficient to maintain the direction of the magnetisation in a desired direction.

What is claimed is:

1. A magnetic head for detecting information-representing magnetic fields on an associated magnetic recording medium movable relatively with respect to the magnetic head, comprising an elongate generally planar magnetoresistive reading element which is current biased provided on two oppositely located ends with contacts for the connection to a source of measuring current, which element has such a magnetic anisotropy that the easy direction of magnetization coincides with the longitudinal axis of the element and which comprises at least one electrically readily conductive strip which is provided obliquely on a surface of the element at an angle of at least 30° and at most 60° with the longitudinal axis of the element, characterized in that the magnetic head comprises two components of magnetically permeable material disposed in mutually aligned relationship, between which components a gap is present, the magnetoresistive element spanning said gap, the facing ends of the components of magnetically permeable material covering the edge zones of the magnetoresistive element extending parallel to the longitudinal axis, the end of one of the components of magnetically permeable material remote from the magneto-resistive element being the medium scanning element, said elongate magnetoresistive element being disposed with the plane thereof in generally perpendicular relationship to the direction of movement of the associated medium which cooperates with said head, the edge zones of the magnetoresistive element covered by the ends of the components of magnetically permeable material corresponding substantially with the areas of the element in which the direction of the current lines is not uniform when a measuring current flows through the element.

2. A magnetic head as claimed in claim 1 characterized in that the conductive strips enclose an angle $\alpha$ with the longitudinal direction of the magneto-resistive element and that the strips are spaced apart a distance d, the covering zones having a width which is substantially constant throughout the length of the element and which is at least equal to $d.\cos(\alpha)$.

3. A magnetic head as claimed in claim 1, characterized in that the thickness of the magnetically permeable component which is destined to cooperate with the recording medium is larger than that of the magnetoresistive element.

4. A magnetic head as claimed in claim 1, characterized in that the ends of the magnetoresistive element where the contacts are present for the connection to a source measuring current are covered by a layer of electrically conductive material over an area which is sufficient to cover magnetic domains formed at the ends.

5. A magnetic head as claimed in claim 1, characterized in that it is manufactured in the form of a multilayer structure wherein:

said two components of magnetically permeable material comprise a magnetic layer of a nickel-iron alloy separated into two parts by said gap, said magneto-resistive reading element comprises a magnetoresistive layer, and said readily conductive strip comprises one or more strips of electrically conductive material.

* * * * *